United States Patent
Bertran et al.

(10) Patent No.: US 9,507,646 B2
(45) Date of Patent: Nov. 29, 2016

(54) CYCLE-LEVEL THREAD ALIGNMENT ON MULTI-THREADED PROCESSORS

(71) Applicant: INTERNATIONAL BUSINESS MACHINES CORPORATION, Armonk, NY (US)

(72) Inventors: Ramon Bertran, Bronx, NY (US); Pradip Bose, Yorktown Heights, NY (US); Alper Buyuktosunoglu, White Plains, NY (US); Timothy J. Siegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/619,153

(22) Filed: Feb. 11, 2015

(65) Prior Publication Data
US 2016/0232039 A1 Aug. 11, 2016

(51) Int. Cl.
*G06F 9/46* (2006.01)
*G06F 9/52* (2006.01)
*G06F 9/48* (2006.01)

(52) U.S. Cl.
CPC . *G06F 9/52* (2013.01); *G06F 9/48* (2013.01); *G06F 9/485* (2013.01); *G06F 9/4806* (2013.01); *G06F 9/4825* (2013.01)

(58) Field of Classification Search
None
See application file for complete search history.

(56) References Cited

U.S. PATENT DOCUMENTS

| | | | | |
|---|---|---|---|---|
| 5,175,699 | A * | 12/1992 | Podkowa | G04G 99/006 702/178 |
| 6,618,815 | B1 * | 9/2003 | Atkins | G06F 1/14 375/356 |
| 7,487,377 | B2 | 2/2009 | Swaney et al. | |
| 7,512,826 | B2 | 3/2009 | Armstrong et al. | |
| 2005/0066211 | A1 * | 3/2005 | Heinrich | H04J 3/0638 713/375 |
| 2006/0179364 | A1 * | 8/2006 | Swaney | G06F 1/14 714/100 |
| 2006/0242442 | A1 * | 10/2006 | Armstrong | G06F 1/14 713/400 |
| 2008/0281563 | A1 * | 11/2008 | Ganai | G06F 11/3608 703/2 |
| 2009/0172424 | A1 * | 7/2009 | Cai | G06F 1/3203 713/300 |
| 2009/0248689 | A1 * | 10/2009 | Petersen | G06F 17/30348 |
| 2010/0299668 | A1 * | 11/2010 | Venkumahanti | G06F 11/3632 718/102 |
| 2012/0089990 | A1 * | 4/2012 | Scheerer | G06F 9/526 719/318 |
| 2012/0180057 | A1 * | 7/2012 | Levine | G06F 11/3476 718/102 |
| 2013/0326256 | A1 * | 12/2013 | Gerwig | G06F 1/12 713/375 |

OTHER PUBLICATIONS

Katz et al, "Synchronization and Time Tagging in Distributed Real Time Simulation", 1990, American Institute of Aeronautics and Astronautics, pp. 846-848.*

(Continued)

*Primary Examiner* — Charles Swift
(74) *Attorney, Agent, or Firm* — Margaret McNamara, Esq.; Blanche E. Schiller, Esq.; Heslin Rothenberg Farley & Mesiti P.C.

(57) ABSTRACT

A time-of-day (TOD) clock is leveraged to provide a high-resolution measure of the real time that is suitable for the indication of date and time to perform cycle-level thread synchronization. A time-of-day value provided by the time-of-day clock is used in a spin lock, along with a configurable mask, to meet a specified condition. The condition is met at regular time intervals and at the same time for all the hardware threads to be synchronized. When the condition is met and synchronization is reached, execution of the threads continues ensuring that the activity generated on each thread is in synchronization.

20 Claims, 7 Drawing Sheets

(56) References Cited

OTHER PUBLICATIONS

Bertran et al., "Voltage Noise in Multi-Core Processors: Empirical Characterization and Optimization Opportunities," originally published on-line Oct. 2, 2014; also published in MICRO '14: Proceedings of the 47th Annual IEEE/ACM International Symposium on Microarchitecture, Dec. 2014, pp. 368-380; Grace Period Disclosure.

Chen et al., "SlackSim: A Platform for Parallel Simulations of CMPs on CMPs," ACM SIGARCH Computer Architecture News, v. 37, No. 2, May 2009. pp. 20-29.

Joshi et al., "Automated Microprocessor Stressmark Generation," IEEE 14$^{th}$ International Symposium on High Performance Computer Architecture, HPCA 2000, IEEE, Feb. 2008, pp. 229-239 (11 pages).

Kim et al., "Audit: Stress Testing the Automatic Way," MICRO-12: Proceedings of the 45th Annual IEEE/ACM International Symposium on Microarchitecture, Dec. 2012, pp. 212-223 (12 pages).

"z/Architecture—Principles of Operation," Publication No. SA22-7832-09, 10$^{th}$ Edition, Sep. 2012, 1568 pages.

\* cited by examiner

CYCLE-LEVEL THREAD ALIGNMENT ON MULTI-THREADED PROCESSORS

STATEMENT REGARDING PRIOR DISCLOSURES BY THE INVENTOR OR JOINT INVENTOR

The following disclosure is submitted under 35 U.S.C. §102(b)(1)(A): "Voltage Noise in Multi-Core Processors: Empirical Characterization and Optimization Opportunities", Bertran et al., pages 1-13, Oct. 2, 2014.

BACKGROUND

One or more aspects relate, in general, to multi-threaded processors, and in particular, to aligning threads on such processors.

Multi-threaded processors include a plurality of hardware threads that can execute concurrently. One example of a multi-threaded processor is a simultaneous multi-threaded (SMT) processor. In simultaneous multithreading, instructions from more than one thread can be executing in any given instruction pipeline stage at a time. Thus, simultaneous multithreading allows multiple independent threads of execution to better utilize the resources provided by the processor architecture.

SUMMARY

Shortcomings of the prior art are overcome and additional advantages are provided through the provision of a computer program product for synchronizing threads in multi-threaded computing environments. The computer program product comprises a storage medium readable by a processing circuit and storing instructions for execution by the processing circuit for performing a method. The method includes, for instance, synchronously obtaining, by a plurality of threads of a multi-threaded computing environment, a time-of-day value, the time-of-day value synchronously obtained by the plurality of threads being a same value; using, by the plurality of threads, the time-of-day value to determine whether a defined condition has been met indicating a synchronization point has been reached for the plurality of threads; and executing the plurality of threads in cycle-level synchronization, based on determining the defined condition has been met indicating the synchronization point has been reached, wherein in cycle-level synchronization, the plurality of threads are switched from one state to another state in a same cycle of the cycle-level synchronization.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a capability is provided for synchronizing threads (e.g., hardware threads) executing within a multi-threaded computing environment. The synchronization is, for instance, a cycle-level synchronization in which the threads to be synchronized start activity and change state at the same cycle. As examples, the multiple hardware threads may execute in a single core (e.g., a physical hardware processor; also referred to herein as a processor or processor core) or across multiple cores within a computing environment. In one example, each core (or a subset of one or more cores of the computing environment) supports, for instance, multi-threading, such as simultaneous multi-threading (SMT), which means there can be effectively multiple logical central processing units (CPUs) operating simultaneously on the same physical processor hardware. Each of these logical CPUs is considered a thread.

Figure 1:
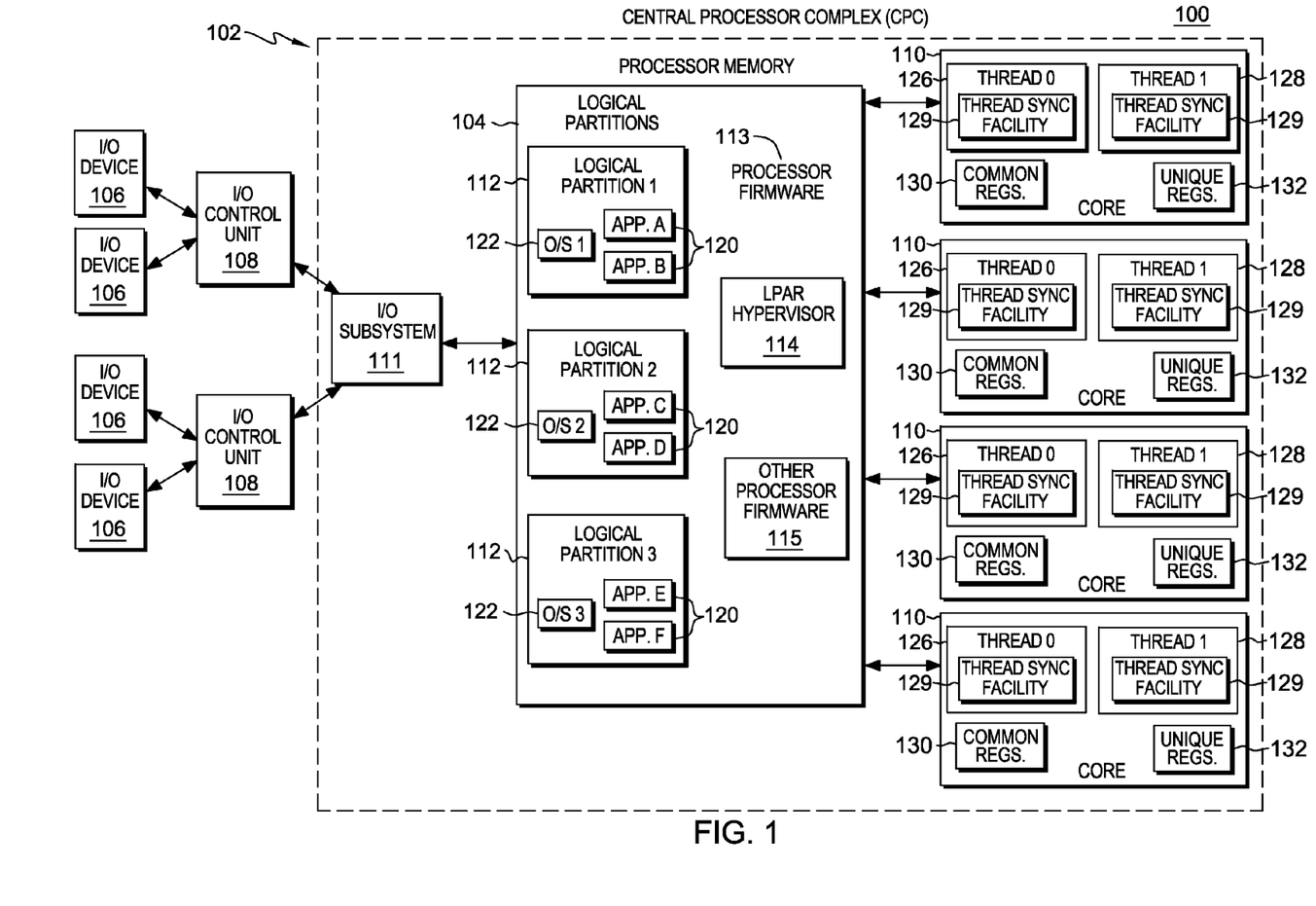
FIG. 1 depicts one example of a computing environment to incorporate and use one or more aspects of a thread synchronization facility.

One example of a computing environment to incorporate and use one or more aspects of a thread synchronization capability is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM® Publication entitled "z/Architecture—Principles of Operation," Publication No. SA22-7832-09, 10th Edition, September 2012, which is hereby incorporated by reference herein in its entirety.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to one or more input/output (I/O) devices 106 via one or more control units 108. Central processor complex 102 includes, for instance, a processor memory 104 (a.k.a., main memory, main storage, central storage) coupled to one or more processor cores 110, and an input/output subsystem 111, each of which is described below.

Processor memory 104 includes, for example, one or more partitions 112 (e.g., logical partitions), and processor firmware 113, which includes, e.g., a logical partition hypervisor 114 and other processor firmware 115. One example of logical partition hypervisor 114 is the Processor Resource/System Manager (PR/SM), offered by International Business Machines Corporation, Armonk, N.Y.

A logical partition functions as a separate system and has one or more applications 120, and optionally, a resident operating system 122 therein, which may differ for each logical partition. In one embodiment, the operating system is the z/OS operating system, the z/VM operating system, the z/Linux operating system, or the TPF operating system, offered by International Business Machines Corporation, Armonk, N.Y.

Logical partitions 112 are managed by logical partition hypervisor 114, which is implemented by firmware running on cores 110. As used herein, firmware includes, e.g., the microcode and/or millicode of the processor core. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Processor cores 110 are physical processor resources allocated to the logical partitions. In particular, each logical partition 112 has one or more logical processors, each of which represents all or a share of a core 110 allocated to the partition. The logical processors of a particular partition 112 may be either dedicated to the partition, so that the underlying core resource 110 is reserved for that partition; or shared with another partition, so that the underlying core resource is potentially available to another partition.

In one example, each core 110 is a multi-threaded processor, such as a simultaneous multi-threaded processor, that includes multiple threads (i.e., multiple logical CPUs operating simultaneously). In this example, each core includes two threads, referred to herein as Thread 0 (126) and Thread 1 (128). However, in other embodiments, each core may include additional threads, such as in a SMT-4 core, the core includes 4 threads. Further, in other embodiments, one or more of the cores may include one thread or a plurality of threads. Not all of the cores need to include the same number of threads. Many variations are possible.

In accordance with one or more aspects, each thread (e.g., thread 126, thread 128) includes hardware and/or logic to be used to synchronize the multiple threads within the computing environment. This hardware and/or logic is referred to as a thread synchronization facility 129 or thread synchronization capability, for convenience.

In support of simultaneous multi-threading, the processor core hardware contains the full architected state (e.g., z/Architecture and micro-architected state) for each thread. Thus, processor-wide registers 130, which are common to all threads (referred to herein as common registers), as well as thread-specific registers 132, which are unique to a thread (referred to herein as unique registers) are provided.

Input/output subsystem 111 directs the flow of information between input/output devices 106 and main storage 104. It is coupled to the central processing complex, in that it can be a part of the central processing complex or separate therefrom. The I/O subsystem relieves the processor cores of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 106. In this particular example, these paths are called channel paths, since the communication adapters are channels.

Figure 2:
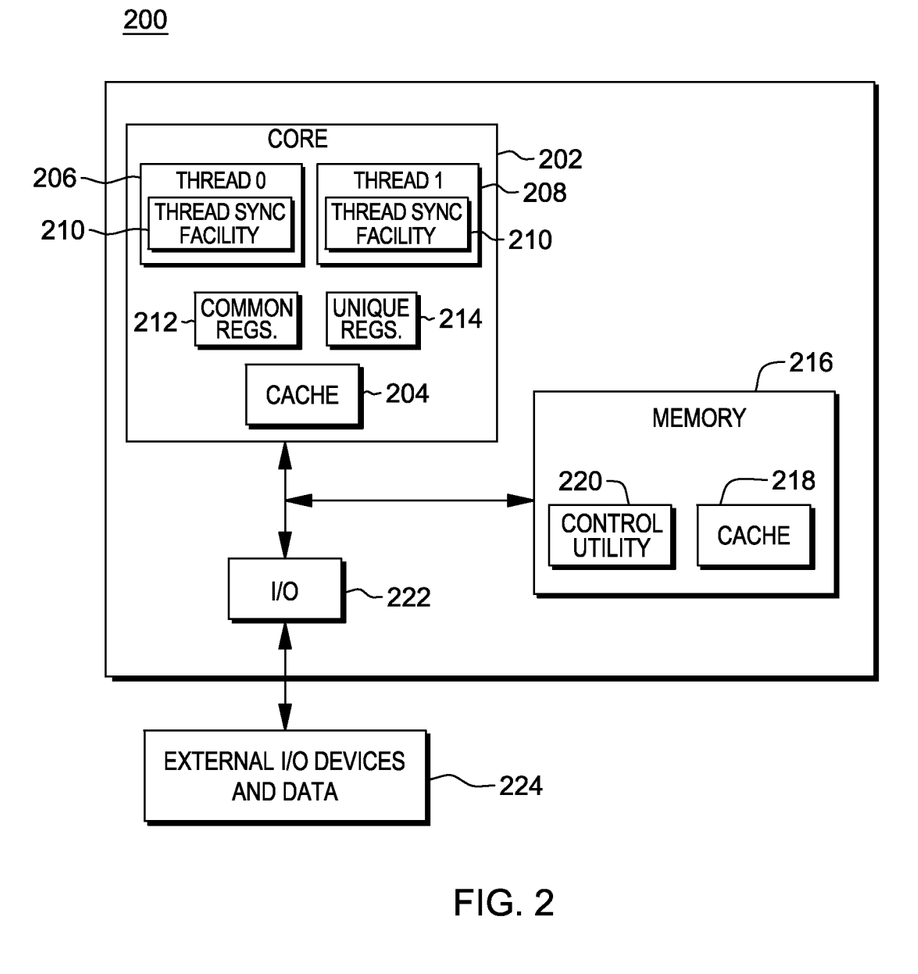
FIG. 2 depicts another example of a computing environment to incorporate and use one or more aspects of a thread synchronization facility.

Another example of a computing environment to incorporate and use one or more aspects of synchronizing threads is described with reference to FIG. 2. In this example, a computing environment 200 includes a non-partitioned environment implemented based on the z/Architecture (or another architecture in another embodiment). It includes a core 202 that includes, for instance, one or more caches 204; at least two threads, Thread 0 (206), Thread 1 (208), each including a thread synchronization facility 210; a common set of registers 212 for the threads; and a unique set of registers 214 for each thread.

Core 202 is communicatively coupled to a memory 216 having one or more caches 218 and at least one control utility 220, such as an operating system; and to an input/output (I/O) subsystem 222. I/O subsystem 222 is communicatively coupled to external I/O devices 224 that may include, for example, data input devices, sensors and/or output devices, such as displays.

Figure 3A:
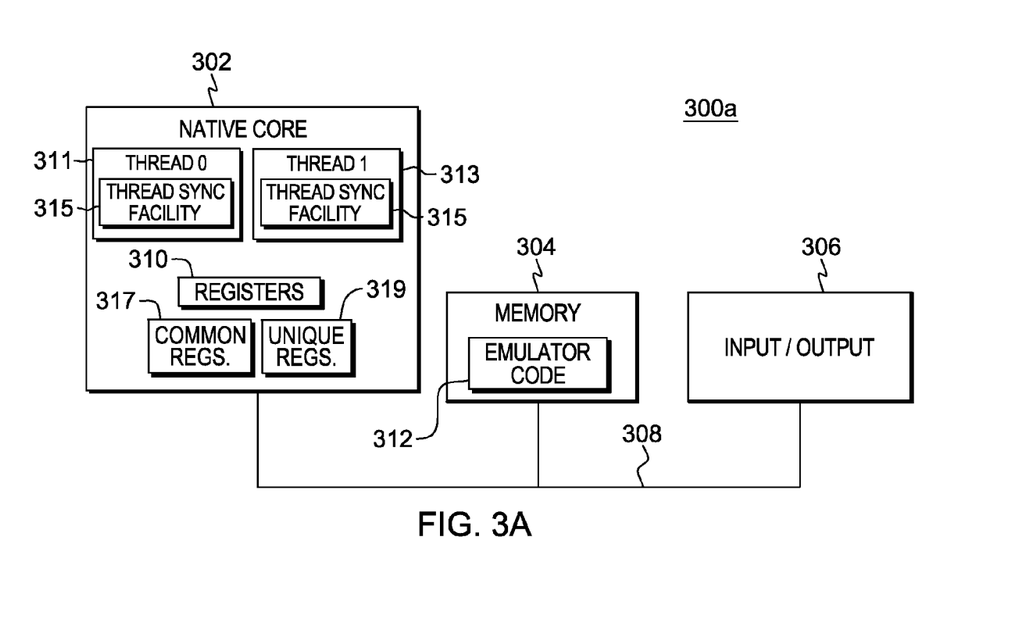
FIG. 3A depicts yet another example of a computing environment to incorporate and use one or more aspects of a thread synchronization facility.

Another embodiment of a computing environment to incorporate and use one or more aspects of a thread synchronization capability is described with reference to FIG. 3A. In this example, a computing environment 300a includes, for instance, at least one native core 302, a memory 304, and one or more input/output devices and/or interfaces 306 coupled to one another via, for example, one or more buses 308 and/or other connections. As examples, computing environment 300a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Each native core 302 of the at least one native core includes one or more native registers 310, such as one or more general purpose registers and/or one or more special purpose registers used during processing within the environment that include information that represents the state of the environment at any particular point in time. Further, native core 302 may include, for instance, at least two threads, Thread 0 (311), Thread 1 (313), each including a thread synchronization facility 315; a set of common registers 317 for the threads; and a set of thread-specific registers 319 for each thread.

Moreover, each native core 302 executes instructions and code that are stored in memory 304. In one particular example, the processor core executes emulator code 312 stored in memory 304. This code enables the computing environment configured in one architecture to emulate one or more other architectures. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture.

Figure 3B:
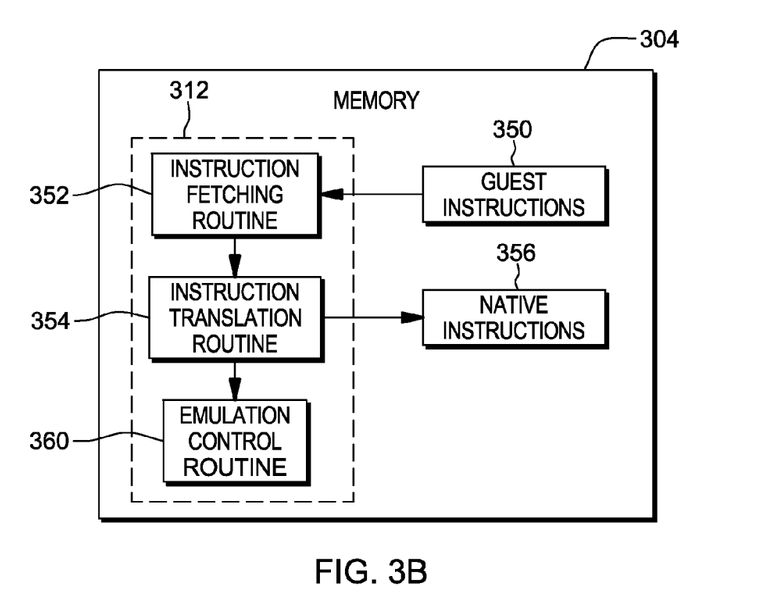
FIG. 3B depicts further details of a memory of the computing environment of FIG. 3A.
Figure 3C:
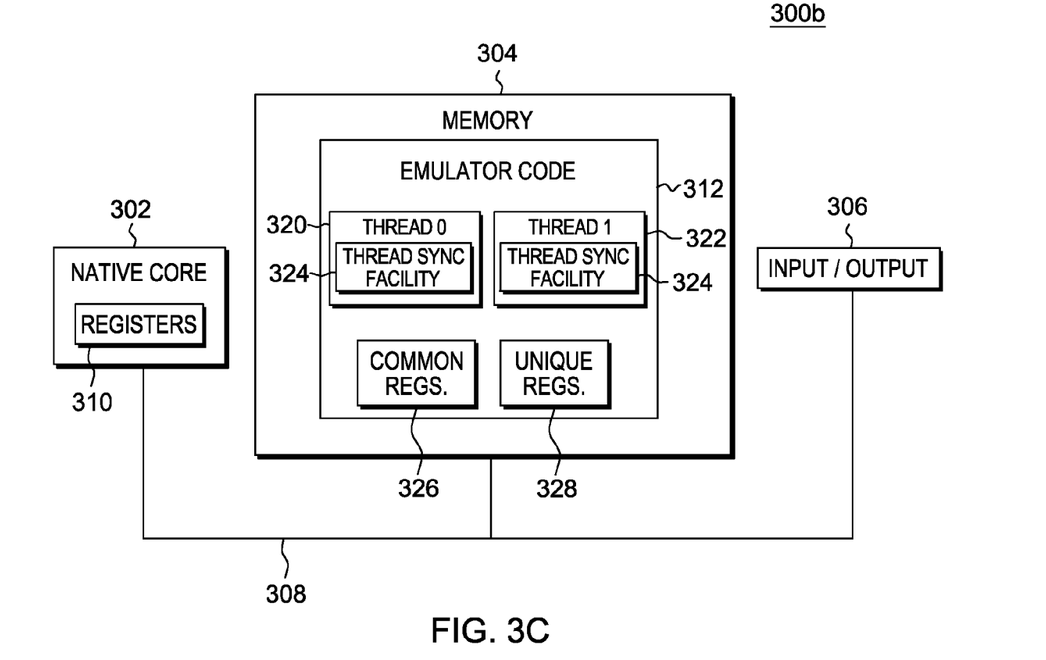
FIG. 3C depicts a further example of a computing environment to incorporate and use one or more aspects of a thread synchronization facility.

In a further embodiment, as shown in FIG. 3C, core 302 is a single-threaded core, but one or more multi-threaded cores are being emulated and included within emulator code 312. For instance, emulator code 312 includes emulated threads 320, 322 (and possibly other threads of other cores being emulated), each including an emulated thread synchronization facility 324; emulated common registers 326 and emulated unique registers 328, each of which is based on an architecture different from the architecture of native core 302, such as the z/Architecture.

Further details relating to emulator code 312 are described with reference to FIG. 3B. Guest instructions 350 stored in memory 304 comprise software instructions (e.g., correlating to machine instructions) that were developed to be executed in an architecture other than that of native core 302. For example, guest instructions 350 may have been designed to execute on a z/Architecture core 202, but instead, are being emulated on native core 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native core 302 to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the thread synchronization facility described herein. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native core 302. In other examples, one or more of the routines or operations are implemented in firmware, hardware, software or some combination thereof. The registers of the emulated processor may be emulated using registers 310 of the native core or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Figure 4:
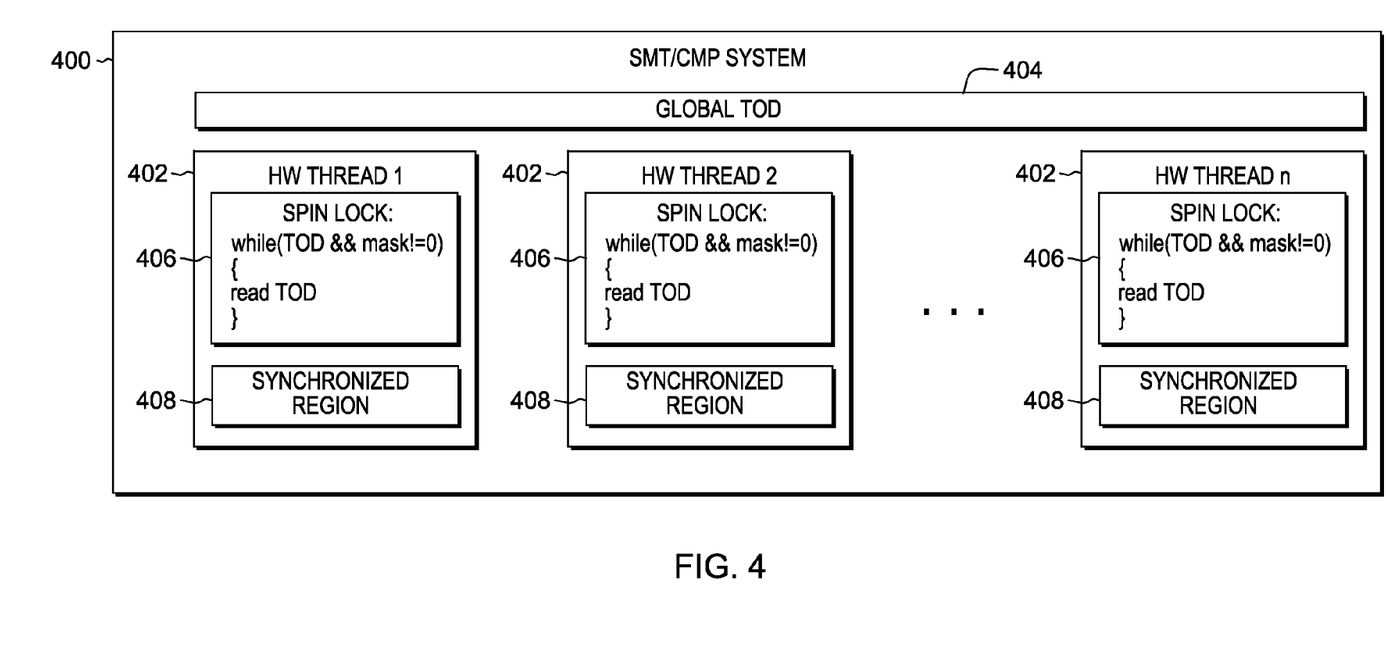
FIG. 4 depicts one example of a simultaneous multi-threaded computing environment that includes a plurality of threads to be synchronized.

Further details regarding synchronizing threads in a multi-threaded environment are described with reference to FIG. 4. As depicted, in one example, a simultaneous multi-threaded (SMT)/chip multiprocessing (CMP) system 400 includes a plurality of threads 402. In this example, the threads are executed within multiple cores. For instance, each core includes, e.g., 2 or 4 threads. As an example, system 400 includes 12 threads that are to be synchronized; 6 cores, each having 2 threads. However, many other examples are possible, and more or less threads may be synchronized in accordance with one or more aspects.

In one embodiment, each thread 402 has access to a global time-of-day (TOD) value 404. Each thread 402 executes a spin lock 406 in which the time-of-day value is read until a defined condition is met. When the condition is met at each thread, the threads are in synchronization 408. The synchronization is, for example, a cycle-level synchronization, in which the threads start activity and change state at the same cycle. In one particular example, at each cycle, the threads switch from one state to another state, in which one of the states is a high power state and the other is a low power state (the switching of the states cause stress and generates, e.g., dI/dt stressmarks).

This synchronization facility provides a deterministic, predictable technique for providing synchronization. The same logic is performed at pre-defined intervals to provide synchronization at defined intervals. The hardware/architecture implementation ensures deterministic access to the global time-of-day (TOD) clock, i.e., the read clock instruction is committed at the same clock tick across the plurality of threads.

Once the threads are synchronized, the threads execute in synchronization and may perform one or more selected activities. For instance, in one example, a selected activity includes generating stressmarks used in maximizing voltage noise used in post-silicon processor testing. The stressmarks are used in, e.g., characterizing voltage noise. Voltage noise characterization is used to optimize the shipped voltage of high-end processor based systems. Voltage noise, i.e., variations in the supply voltage due to transient fluctuations on current, can negatively affect the robustness of system designs, if it is not properly characterized. Maximum noise stressmarks are generated, for instance, by alternatively concatenating instruction sequences that have maximum power consumption and minimum power consumption. The synchronized transitions of the plurality of threads from maximum power state to minimum power state, and vice-versa, result in fast changes on power supply demand, thus, generating voltage noise events.

Figure 5:
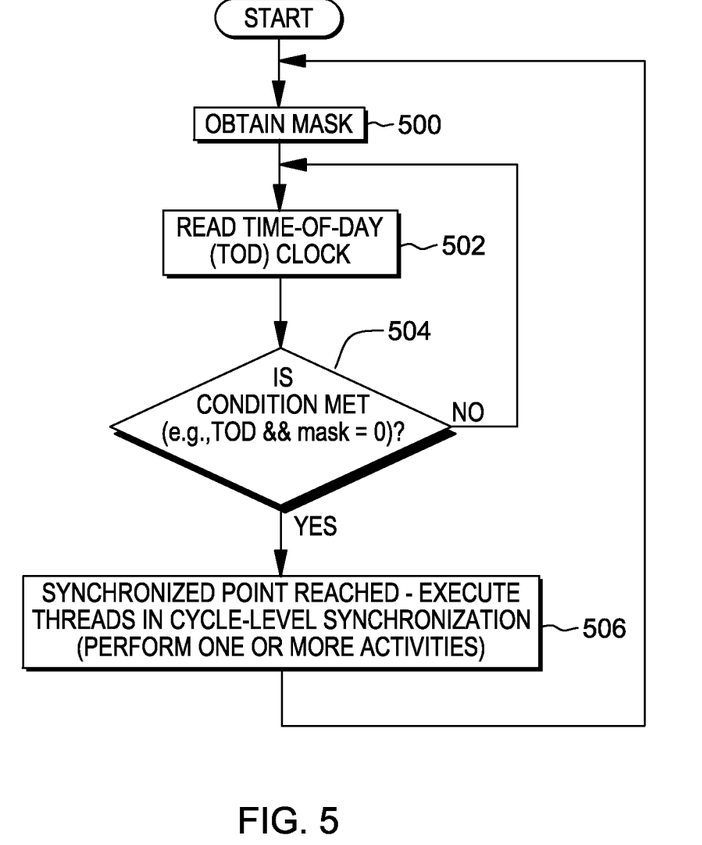
FIG. 5 depicts one embodiment of logic to synchronize threads in a multi-threaded computing environment.

One embodiment of logic to perform thread synchronization is described with reference to FIG. 5. This logic is performed by each thread to be synchronized.

Initially, in one embodiment, a thread obtains a mask used in determining whether the condition is met, STEP 500. The mask may be stored in a memory location accessible to the thread or provided as input to the thread, as examples. The mask is used, in one embodiment, to control the frequency between synchronization points (e.g., every 4 ms, every second, etc.) For example, for every 4 ms, the mask has a value of 0x000000000000ffff, and for every 1 second, the mask has a value of 0x0000000000ffffff. The mask is configurable by the user or another entity.

The thread obtains a time-of-day value, STEP 502, by, for instance, executing an instruction to read the time-of-day (TOD) clock shared by all the threads in the configuration. A determination is made as to whether a particular condition is met (e.g., is the TOD value ANDed with the mask equal to zero), INQUIRY 504. If the condition is not met, then the thread continues to obtain the TOD value, by e.g., executing the instruction to access the time-of-day clock. However, if the condition is met, then a synchronization point for the thread (and the other threads) is met allowing the threads to execute in cycle-level synchronization, and optionally, perform one or more selected activities, STEP 506. As indicated herein, the activity may include generating stressmarks at each cycle by switching the state between high consumption power and low consumption power.

Subsequent to obtaining synchronization, the process repeats at defined intervals defined by the mask. For instance, the logic is repeated such that synchronization is reached, e.g., every 4 ms or every 1 second, etc., as defined by the mask. Thus, flow returns to STEP 500, or alternatively, to STEP 502, as examples.

As indicated above, to obtain the time-of-day value, an instruction is executed by the thread. In one implementation, this instruction is a private instruction implemented in the Instruction Set Architecture (ISA) to synchronously and simultaneously access the time-of-day clock from all of the hardware threads in the system. In one example, in which the ISA is the z/Architecture, the instruction is the Store Clock instruction.

Figure 6:
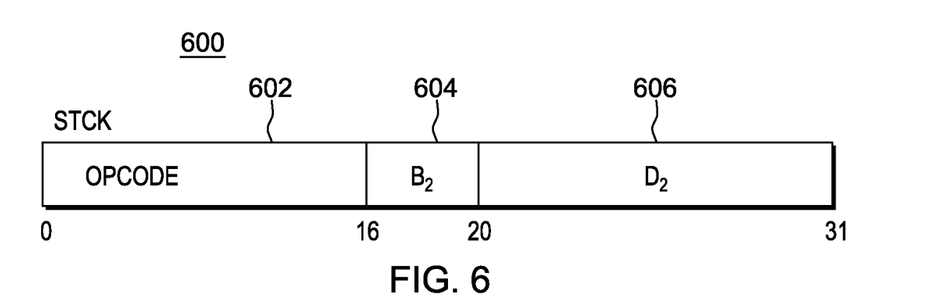
FIG. 6 depicts one example of a format of a store clock instruction used in accordance with one aspect of synchronizing threads.

One example of a format of the Store Clock instruction is described with reference to FIG. 6. In one embodiment, a Store Clock (STCK) instruction 600 includes an opcode field 602 having an opcode indicating a store clock operation; a first field 604, referred to as a base field ($B_2$), and a second field 606, referred to as a displacement field ($D_2$). The contents of the general register designated by the $B_2$ field are added to the contents of the $D_2$ field to form a second operand address.

In operation of the Store Clock instruction, in one embodiment, the current value of bits 0-63 of the TOD clock is stored in the eight-byte field designated by the second operand address, provided the clock is in the set, stopped, or not-set state.

When the clock is stopped, zeros are stored in positions to the right of the rightmost bit position that is incremented when the clock is running. When the value of a running clock is stored, nonzero values may be stored in positions to the right of the rightmost incremented bit; this is to ensure that a unique value is stored.

Zeros are stored at the operand location when the clock is in the error state or the non-operational state.

The quality of the clock value stored by the instruction is indicated by the resultant condition-code setting.

A serialization function may be performed before the value of the clock is fetched and again after the value is placed in storage.

Example Resulting Condition Codes include:
0 Clock in set state
1 Clock in not-set state
2 Clock in error state
3 Clock in stopped state or not-operational state
Possible Program Exceptions include, for instance:
Access (store, operand 2)
Transaction constraint
Further, in one embodiment:
Bit position 31 of the clock is incremented every 1.048576 seconds; hence, for timing applications involving human responses, the leftmost clock word may provide sufficient resolution.
Condition code 0 normally indicates that the clock has been set by the control program. Accordingly, the value may be used in elapsed-time measurements and as a valid time-of-day and calendar indication. Condition code 1 indicates that the clock value is the elapsed time since the power for the clock was turned on. In this case, the value may be used in elapsed-time measurements but is not a valid time-of-day indication. Condition codes 2 and 3 mean that the value provided by Store Clock is not to be used for time measurement or indication, in this example.
Condition code 3 indicates that the clock is in either the stopped state or the not operational state. These two states can normally be distinguished because an all-zero value is stored when the clock is in the not-operational state.

As described herein, in one or more aspects, the TOD clock is leveraged to provide a high-resolution measure of the real time that is suitable for the indication of date and time to perform cycle-level thread synchronization. The TOD is used in a spin lock, along with the configurable mask, to meet a specified condition. The condition is met at regular time intervals and at the same time for all the hardware threads. Once the condition is met and synchronization is reached, execution of the threads continues ensuring that the activity generated on each thread is in synchronization.

One activity that is performed during synchronization may be generating dI/dt stressmarks to maximize voltage noise. Voltage noise characterization is one aspect of optimizing shipped voltage of high-end processor based systems. This is described further in "Voltage Noise in Multi-core Processors: Empirical Characterization and Optimization Opportunities," Ramon Bertran et al., In MICRO '14: Proceedings of the 45th Annual IEEE/ACM International Symposium on Microarchitecture, December 2014, which is hereby incorporated herein by reference in its entirety.

Max-noise stressmarks are used by computer architects to make early-stage design decisions such as the design of the package and the power delivery network. They are also used to calibrate noise-aware mechanisms at post-silicon design stages. Worst case noise events happen when all the cores of the system generate high current droops simultaneously. Proper alignment of threads is a traditionally cumbersome, difficult process, and therefore, a systematic, deterministic methodology is provided herein to synchronize threads.

In one or more aspects, a reliable capability is provided to ensure configurable cycle-level alignments between hardware threads on a SMT/CMP system via cycle-level synchronization using instructions present in the ISA. One or more aspects enable a detailed characterization of voltage noise; an alignment control for multi-threaded functional verification test cases; and research on thread-alignment optimizations (e.g., application balancing). The global cycle-accurate timing facilities implemented in the architecture (e.g., the TOD clock) are leveraged to ensure configurable cycle-level alignments between hardware threads on a SMT/CMP system. A specific privileged/non-public ISA instruction is used to access synchronously and simultaneously the global cycle-accurate timing facilities from the hardware threads present in the system. The cycle-level multi-thread alignment is used, e.g., to maximize the noise generated by dI/dt stressmarks, and to control the level of alignment (control the displacement between threads).

Although in one or more of the examples described herein all of the threads in the environment (e.g., the SMT/CMP system) are synchronized, in other embodiments, threads within one or more cores, but less than all of the cores, are synchronized. Other examples are also possible.

As used herein, storage, central storage, main storage, memory and main memory are used interchangeably, unless otherwise noted, implicitly by usage or explicitly.

Figure 7:
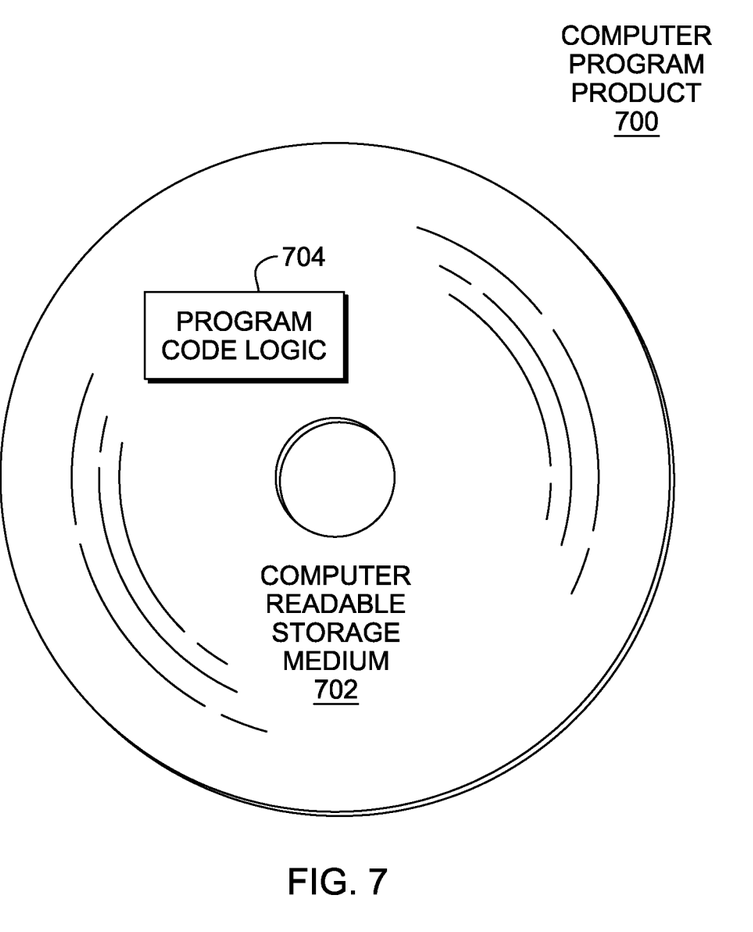
FIG. 7 depicts one embodiment of a computer program product to incorporate one or more aspects of a thread synchronization capability.

Referring to FIG. 7, in one example, a computer program product 700 includes, for instance, one or more non-transitory computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for synchronizing threads in multi-threaded computing environments, said computer program product comprising:
    a computer readable storage medium readable by a processing circuit and storing instructions for execution by the processing circuit for performing a method comprising:
        deterministically and predictably providing a synchronization point comprising:
            synchronously obtaining, by a plurality of threads of a multi-threaded computing environment, a time-of-day value, the time-of-day value synchronously obtained by the plurality of threads being a same value, and wherein the obtaining the time-of-day value is deterministic; and
            using, by the plurality of threads, the time-of-day value to determine whether a defined condition has been met indicating a synchronization point has been reached for the plurality of threads, wherein based on reaching the synchronization point by the plurality of threads, the plurality of threads are in cycle-level synchronization;
        executing the plurality of threads in cycle-level synchronization, based on determining the defined condition has been met indicating the synchronization point has been reached, wherein in cycle-level synchronization, the plurality of threads are switched from one state to another state in a same cycle of the cycle-level synchronization; and
        generating stressmarks by the plurality of threads, based on the plurality of threads being in cycle-level synchronization, the cycle-level synchronization being deterministically and predictably provided using the time-of-day value.

2. The computer program product of claim 1, wherein the one state comprises high power or low power, and the other state is the other of high power or low power.

3. The computer program product of claim 1, wherein the using the time-of-day value to determine whether the defined condition has been met comprises using the time-of-day value and a mask to determine whether the defined condition has been met.

4. The computer program product of claim 3, wherein the mask is configurable by a user, and controls a frequency between synchronization points.

5. The computer program product of claim 3, wherein the using the time-of-day value and the mask to determine whether the defined condition has been met comprises:
    performing a logical operation with the time-of-day value and the mask to obtain a value; and
    comparing the value to a selected value to determine whether the defined condition has been met.

6. The computer program product of claim 5, wherein the logical operation comprises an AND operation, the selected value comprises zero, and wherein based on the value equaling zero, the defined condition has been met.

7. The computer program product of claim 1, wherein the time-of-day value is provided by a time-of-day clock shared by the plurality of threads.

8. The computer program product of claim 7, wherein the plurality of threads are executing within multiple cores of the computing environment, the multiple cores having concurrent access to the time-of-day clock.

9. The computer program product of claim 1, wherein the synchronously obtaining the time-of-day value comprises using a store clock instruction to read a time-of-day clock to obtain the time-of-day value, the store clock instruction being included in an instruction set architecture of the multi-threaded computing environment.

10. The computer program product of claim 1, wherein the generating stressmarks comprises alternatively concatenating instruction sequences that have maximum power consumption and minimum power consumption.

11. The computer program product of claim 1, wherein the synchronously obtaining the time-of-day value comprises using a store clock instruction to read a time-of-day clock accessible to the plurality of threads to obtain the time-of-day value, and wherein the using the time-of-day value comprises:
    performing an AND operation with the time-of-day value and a selected mask to obtain a value; and comparing the value to a selected value to determine whether the defined condition has been met.

12. A computer system for synchronizing threads in multi-threaded computing environments, said computer system comprising:
   a memory; and
   a processor in communications with the memory, wherein the computer system is configured to perform a method, said method comprising:
      deterministically and predictably providing a synchronization point comprising:
         synchronously obtaining, by a plurality of threads of a multi-threaded computing environment, a time-of-day value, the time-of-day value synchronously obtained by the plurality of threads being a same value, and wherein the obtaining the time-of-day value is deterministic; and
         using, by the plurality of threads, the time-of-day value to determine whether a defined condition has been met indicating a synchronization point has been reached for the plurality of threads, wherein based on reaching the synchronization point by the plurality of threads, the plurality of threads are in cycle-level synchronization;
      executing the plurality of threads in cycle-level synchronization, based on determining the defined condition has been met indicating the synchronization point has been reached, wherein in cycle-level synchronization, the plurality of threads are switched from one state to another state in a same cycle of the cycle-level synchronization; and
      generating stressmarks by the plurality of threads, based on the plurality of threads being in cycle-level synchronization, the cycle-level synchronization being deterministically and predictably provided using the time-of-day value.

13. The computer system of claim 12, wherein the using the time-of-day value to determine whether the defined condition has been met comprises using the time-of-day value and a mask to determine whether the defined condition has been met, wherein the mask is configurable by a user, and controls a frequency between synchronization points.

14. The computer system of claim 13, wherein the using the time-of-day value and the mask to determine whether the defined condition has been met comprises:
   performing a logical operation with the time-of-day value and the mask to obtain a value; and
   comparing the value to a selected value to determine whether the defined condition has been met.

15. The computer system of claim 14, wherein the logical operation comprises an AND operation, the selected value comprises zero, and wherein based on the value equaling zero, the defined condition has been met.

16. The computer system of claim 12, wherein the synchronously obtaining the time-of-day value comprises using a store clock instruction to read a time-of-day clock to obtain the time-of-day value, the store clock instruction being included in an instruction set architecture of the multi-threaded computing environment.

17. A method of synchronizing threads in multi-threaded computing environments, said method comprising:
   deterministically and predictably providing a synchronization point comprising:
      synchronously obtaining, by a plurality of threads of a multi-threaded computing environment, a time-of-day value, the time-of-day value synchronously obtained by the plurality of threads being a same value, and wherein the obtaining the time-of-day value is deterministic; and
      using, by the plurality of threads, the time-of-day value to determine whether a defined condition has been met indicating a synchronization point has been reached for the plurality of threads wherein based on reaching the synchronization point by the plurality of threads, the plurality of threads are in cycle-level synchronization;
   executing the plurality of threads in cycle-level synchronization, based on determining the defined condition has been met indicating the synchronization point has been reached, wherein in cycle-level synchronization, the plurality of threads are switched from one state to another state in a same cycle of the cycle-level synchronization; and
   generating stressmarks by the plurality of threads, based on the plurality of threads being in cycle-level synchronization, the cycle-level synchronization being deterministically and predictably provided using the time-of-day value.

18. The method of claim 17, wherein the using the time-of-day value to determine whether the defined condition has been met comprises using the time-of-day value and a mask to determine whether the defined condition has been met, and wherein the mask is configurable by a user, and controls a frequency between synchronization points.

19. The method of claim 17, wherein the synchronously obtaining the time-of-day value comprises using a store clock instruction to read a time-of-day clock to obtain the time-of-day value, the store clock instruction being included in an instruction set architecture of the multi-threaded computing environment.

20. The method of claim 17, wherein the synchronously obtaining the time-of-day value comprises using a store clock instruction to read a time-of-day clock accessible to the plurality of threads to obtain the time-of-day value, and wherein the using the time-of-day value comprises:
   performing an AND operation with the time-of-day value and a selected mask to obtain a value; and
   comparing the value to a selected value to determine whether the defined condition has been met.

* * * * *

UNITED STATES PATENT AND TRADEMARK OFFICE
CERTIFICATE OF CORRECTION

PATENT NO.       : 9,507,646 B2
APPLICATION NO.  : 14/619153
DATED            : November 29, 2016
INVENTOR(S)      : Monfort et al.

It is certified that error appears in the above-identified patent and that said Letters Patent is hereby corrected as shown below:

On the Title Page

In the Inventor (72): Delete "Ramon Bertran" and insert --Ramon Bertran Monfort--

Signed and Sealed this
Sixth Day of October, 2020

Andrei Iancu
*Director of the United States Patent and Trademark Office*